(12) United States Patent
Lundgren

(10) Patent No.: US 7,762,677 B2
(45) Date of Patent: Jul. 27, 2010

(54) OPTICAL SYSTEM WITH INTER-LENS BAFFLES

(75) Inventor: Mark A. Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 11/872,511

(22) Filed: Oct. 15, 2007

(65) Prior Publication Data

US 2009/0097124 A1 Apr. 16, 2009

(51) Int. Cl.
*G02B 27/00* (2006.01)

(52) U.S. Cl. .................. 359/613; 359/601; 359/399

(58) Field of Classification Search ......... 359/399–430, 359/511, 601–615, 633
See application file for complete search history.

(56) References Cited

U.S. PATENT DOCUMENTS

| 3,850,504 | A | * | 11/1974 | Bisbee | 359/511 |
| 4,540,238 | A | * | 9/1985 | Edwards | 359/481 |
| 4,772,096 | A | * | 9/1988 | Kai et al. | 359/601 |
| 4,929,055 | A | * | 5/1990 | Jones | 359/601 |
| 5,121,251 | A | * | 6/1992 | Edwards | 359/368 |
| 5,159,495 | A | * | 10/1992 | Hamblen | 359/731 |
| 5,210,645 | A | * | 5/1993 | Orino et al. | 359/738 |
| 5,745,292 | A | * | 4/1998 | Jones | 359/613 |
| 5,831,769 | A | * | 11/1998 | Smith | 359/634 |
| 6,024,458 | A | | 2/2000 | Lundgren | |
| 7,075,736 | B1 | | 7/2006 | Lundgren | |

OTHER PUBLICATIONS

Probst; "System Design Note, NFM-AD-02-3103 NEWFIRM Telescope and instrument baffle requirements"; Feb. 20, 2003.

* cited by examiner

*Primary Examiner*—Thong Nguyen
(74) *Attorney, Agent, or Firm*—Yee & Associates, P.C.; Kevin G. Fields

(57) ABSTRACT

An inter-lens baffles unit for an imaging system is provided. The inter-baffle lens unit comprises at least two lens elements; a plurality of baffles positioned between the two lens elements, wherein the baffles are contoured to fit between the two lenses and to fill a volume between the lenses such that the baffles are parallel to an optical path of an imaging system.

19 Claims, 7 Drawing Sheets

OPTICAL SYSTEM WITH INTER-LENS BAFFLES

BACKGROUND

1. Technical Field

This disclosure relates generally to imaging systems, and more particularly, to optical imaging systems using baffles.

2. Related Art

Optical instruments are typically used to generate images of objects and may include cameras or telescopes. Both cameras and telescopes may be used for general everyday use or may be used in space vehicles (for example, satellites, space shuttles, nano-satellites, international space station and others).

Optical instruments typically use imaging systems (also referred to as optical systems) to generate images. However, sometimes these images may have flare. Flare is the collective name for colored spots, ghost images or veils that impair or distort an image. Flare is typically caused by stray light from a source of light (for example, the sun) impinging on a frontal lens of an imaging system. Typically, stray light is propagated between lens elements before finally reaching an imaging film or a digital sensor.

Controlling flare is desirable especially in imaging systems for space vehicle optical instruments because space vehicle optical instruments are exposed to extreme and intense illumination due to the absence of atmosphere in space. To form a clear and sharp image, it is desirable to block stray light rays from reaching a lens (or glass elements) of the imaging systems. Typically, imaging systems use sunshields (shades or hoods) for shielding a lens from stray light. The sunshields protrude from the imaging system. In addition, imaging systems may use a plurality of baffles (or vanes, used interchangeably) outside the optical path. Typically, baffles are placed perpendicular to the optical path of an imaging system for blocking the propagation of stray light.

However, in conventional systems, baffles placed perpendicular to the optical path, and sunshields fail to effectively block stray light because stray light may still propagate and clutter (or degrade) a final image.

Therefore there is a need for an optical imaging system for use in optical instruments that reduces flare and produces sharp and clear images.

SUMMARY

In one embodiment, an inter-baffle lens unit for an imaging system is provided. The inter-baffle lens unit comprises at least two lens elements; and a plurality of baffles positioned between the two lens elements, wherein the baffles are contoured to fit between the two lenses and to fill an entire volume between the lenses such that the baffles are parallel to an optical path of the imaging system.

In another embodiment, an optical system is provided. The optical system comprises at least a first lens and a second lens; an array of baffles positioned between the first lens and the second lens, forming a baffled lens unit; wherein the array is contoured to fit between the first and the second lens and to fill an entire volume between the lenses such that the baffles are parallel to an optical path of the imaging system.

In yet another embodiment, an optical system is provided. The optical system comprises a plurality of lenses; and an array of baffles positioned between two lenses, forming a baffled lens unit; wherein the array is contoured to fit between the two lenses, fill an entire volume between the lenses, and each baffle is substantially parallel to an optical path of the optical system.

This brief summary has been provided so that the nature of the disclosure may be understood quickly. A more complete understanding of the disclosure may be obtained by reference to the following detailed description of the preferred embodiments thereof in connection with the attached drawings.

BRIEF DESCRIPTION OF THE DRAWINGS

The foregoing features and other features of the present disclosure will now be described with reference to the drawings of a preferred embodiment. In the drawings, the same components have the same reference numerals. The illustrated embodiment is intended to illustrate, but not to limit the disclosure. The drawings include the following Figures.

DETAILED DESCRIPTION OF THE PREFERRED EMBODIMENTS

In one aspect of the present disclosure an imaging system with an inter lens baffle system is provided. According to one embodiment, the imaging system of the present disclosure effectively rejects stray light and forms sharp and clear images.

To facilitate an understanding of an imaging system of the present disclosure, first an overview of a typical imaging system will be described. The specific structural components of the imaging system of the present disclosure will then be described with specific reference to general structure.

Figure 1:
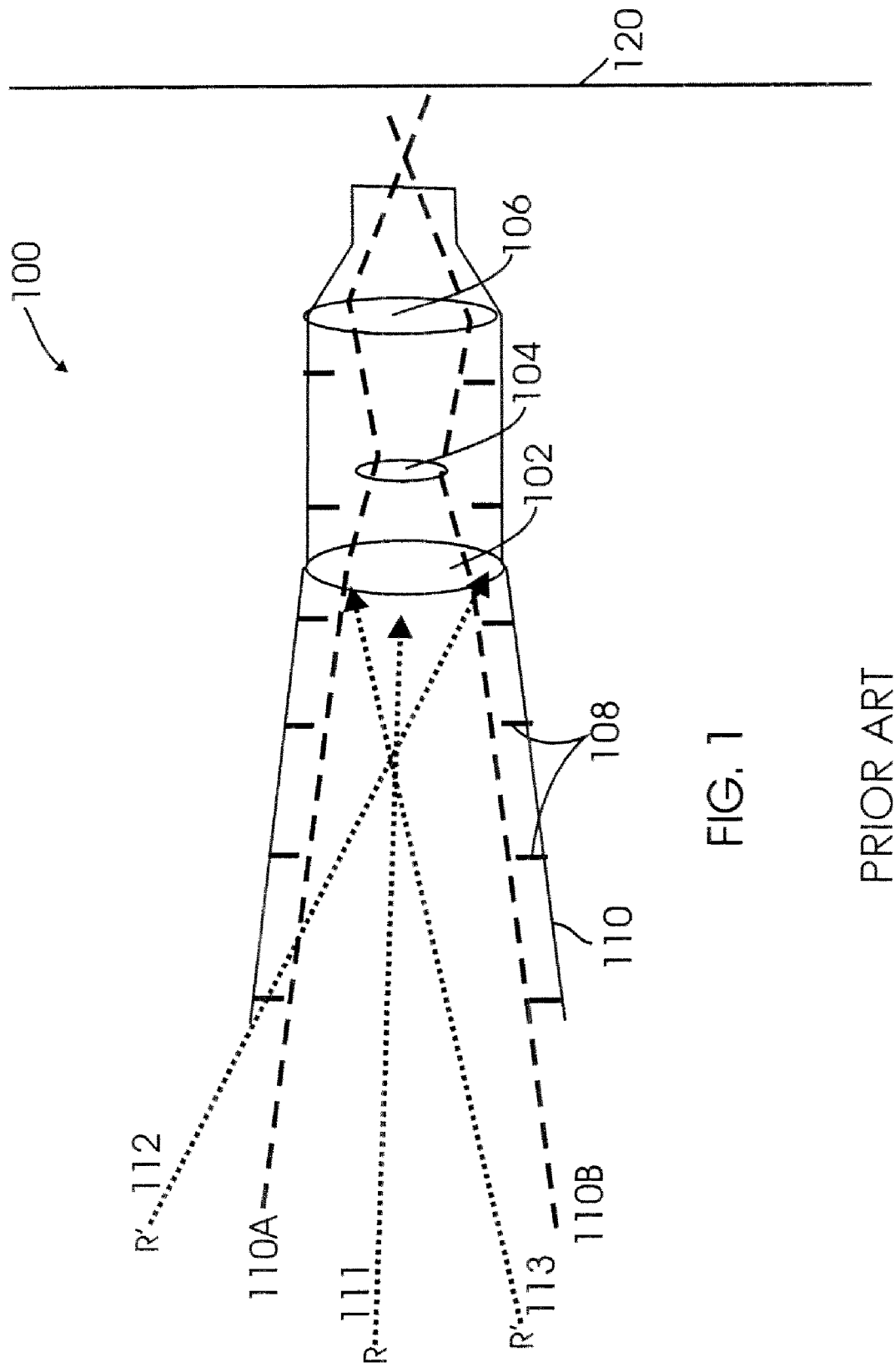
FIG. 1 shows an imaging system with a lens hood and baffles perpendicular to an optical path.

FIG. 1 shows an example of a conventional imaging system 100 with a plurality of lenses (or lens elements) 102, 104 and 106. The incident light includes a chief ray (R, 111) and some unwanted light rays R' (112, 113) (also referred to as stray light or stray light rays) The incident light rays (R 111, R' 112 and R' 113) enter the imaging system 100 from a range of predetermined directions generally parallel to the axis of the imaging system.

The chief ray (111) is generally the ray that starts at the end of an object that is imaged (not shown) and passes through the center of an aperture to form an image at image plane 120. Some unwanted rays (R', 112, 113) may be blocked by sunshields 110 (hood) from propagating within imaging system 100.

However, sunshield 110 may not prevent all of unwanted rays (112, 113) from making contact with lens elements (102, 104, 106), especially if some of these rays enter at an exclusion angle for imaging system 100. Exclusion angle is an angle that barely blocks a ray of light and some light rays still propagate within imaging system 100. Exclusion angle is inversely proportional to the length of sunshields 110, i.e., longer the sunshield, smaller the exclusion angle, and smaller the chance of stray light entering and propagating in imaging system 100. Ray R' 113 is an example of stray light ray at the exclusion angle, where the lens is not protected by the sunshield 110. Stray light ray 113 strikes the first lens element 102 of imaging system 100 and propagates within imaging system 100 to form undesired spots. Therefore, imaging system 100 with sunshield 110 is still prone to stray light propagation, which adversely affects the image quality. It is desirable to minimize propagation of stray light and allow passage of chief ray (R, 111) to form a clear, sharp, and well defined image.

It is to be understood that a lens may be made of plurality of lens elements. For the purposes of this disclosure, the term "lens elements" and "lens(es)" is used interchangeably.

Imaging system 100 may also use a plurality of baffles 108 which are placed outside and substantially perpendicular to the designed optical path (110A, 110B). Even after the combined use of baffles 108 and sunshield 110, stray light (112 and 113) may still propagate and degrade the final image. Also, sunshield 110 is long, fragile and hence maybe inconvenient, especially on space vehicle imaging systems. Furthermore, it may not be possible to use sunshields on imaging systems for missiles and other applications. It is to be understood that the term baffle (or baffle-vanes) may refer to a single annular ring or a plurality of annular rings. The term baffles or baffle-vanes may be used interchangeably throughout the description.

Figure 2A:
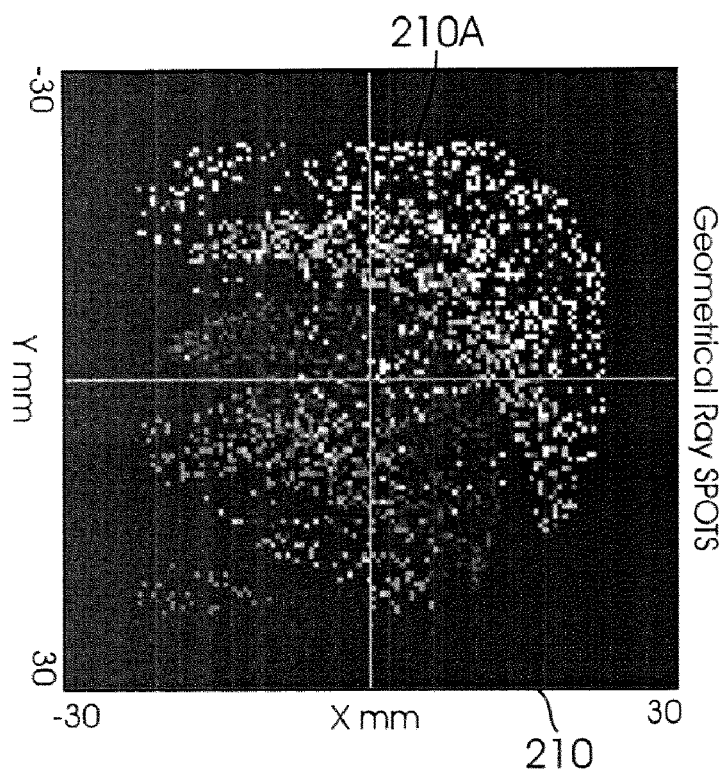
FIGS. 2A and 2B show effects of stray light on images formed by the imaging system of FIG. 1.
Figure 2B:

FIGS. 2A and 2B show images 210 and 212 formed by the imaging system 100. Spots 210A and 212A on images 210 and 212 respectively are formed as a result of stray light propagation within the imaging system. Spots 210A and 212A are undesirable.

The adaptive embodiments described below minimize the effect of stray light 112 and 113.

In one embodiment, an imaging system is provided that forms a clear and sharp image even when the system is exposed to extreme illumination by a source of light (for example, the sun). The imaging system of the present disclosure effectively reduces stray light propagation within an imaging system.

Figure 3A:
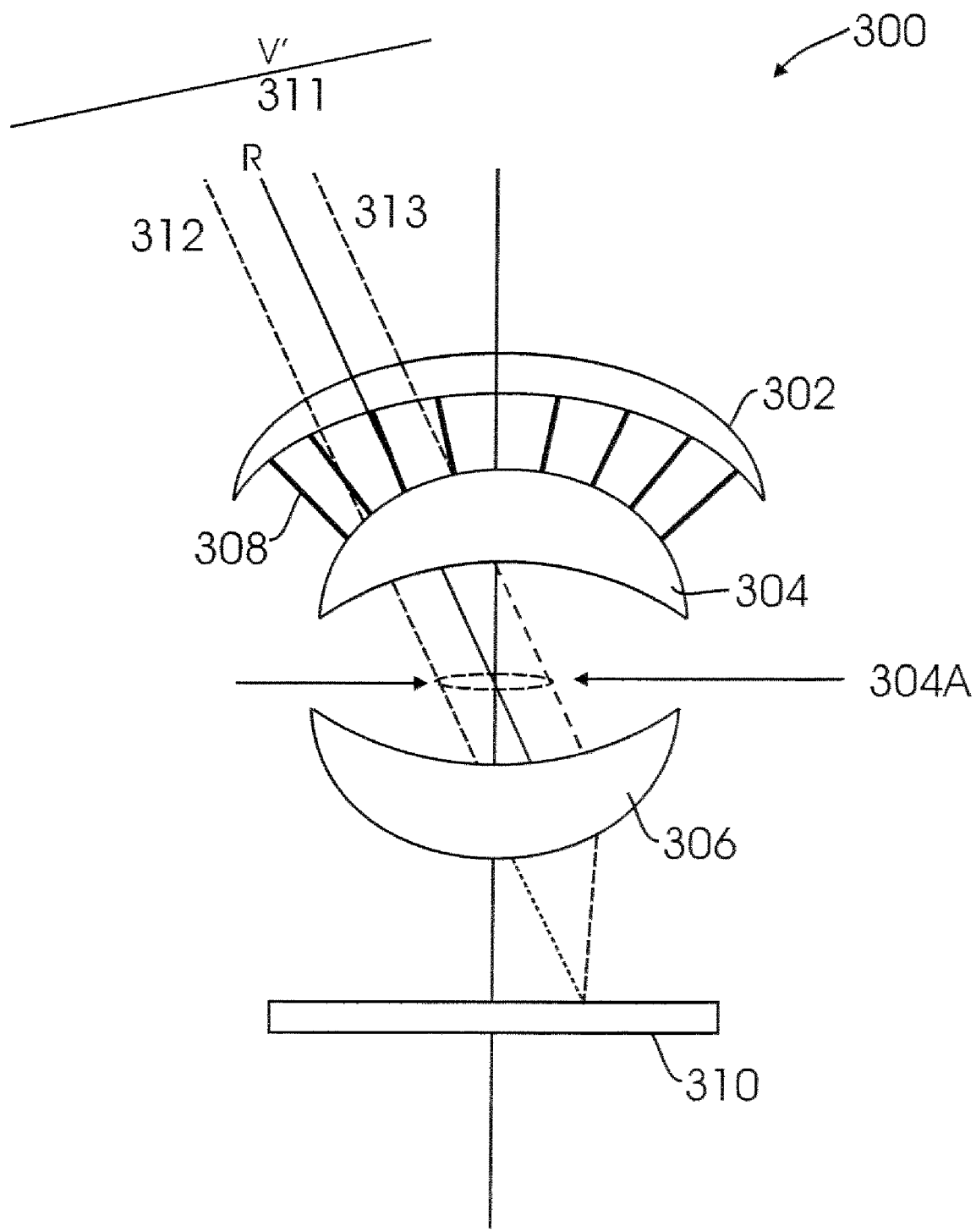
FIG. 3A shows an imaging system, according to an embodiment.

FIG. 3A shows an imaging system 300, according to an embodiment of the disclosure. The imaging system 300 includes a plurality of lens elements (302, 304, and 306) and a plurality of baffles 308 placed between the lens elements (302 and 304) substantially parallel to an optical path. Baffles 308 block passage and propagation of stray light (312 and 313) within the imaging system 300. Baffles 308 may be placed in the space between lens elements 302 and 304. Preferably, baffles 308 may be contoured to fit between the lens elements (302 and 304).

In one embodiments, baffles 308 are optically absorbing members. Baffles 308 may be constructed from carbon composite, plastic, thin black metallic material and similar other material. These optically absorbing baffles prevent propagation of unwanted stray light rays within the imaging system.

The number of baffles 308 used in an imaging system 300 depends on the nature and type of lens (302, 304, 306) used in imaging system 300.

Baffles 308 are substantially parallel to an optical path of the incident rays (311, 312, and 313). The parallel placement of baffles (308) helps in controlling the amount of light rays that reaches the film 310. If the baffles went across the optical path, light may be lost from the desired target. Therefore, parallel placement of baffles keeps the baffles from removing too much desired light from the target. The chief ray R (311) passes through the center of pupil aperture 304A, while the rays (312 and 313) pass through the edges of the pupil aperture 304A.

Further, for a portion of a field of view (V'), rays 312 and 313 are parallel to the optical path (311) of the incident light. Thus over a portion of the field of view, lens elements (302, 304) act as telecentric lenses having constant viewing angle at any point across pupil aperture 304A. This enables elimination of stray light and formation of sharp and accurate images.

Figure 3B:
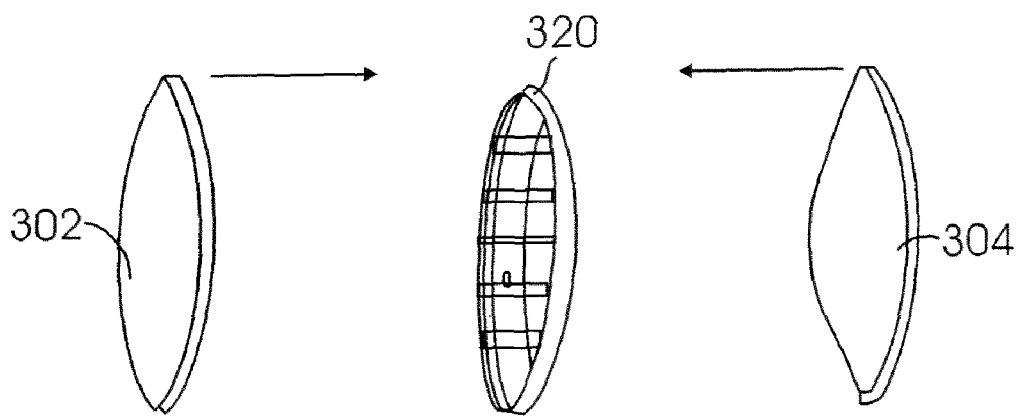
FIG. 3B-3E shows a schematic of a baffle structure according to one embodiment.
Figure 3C:
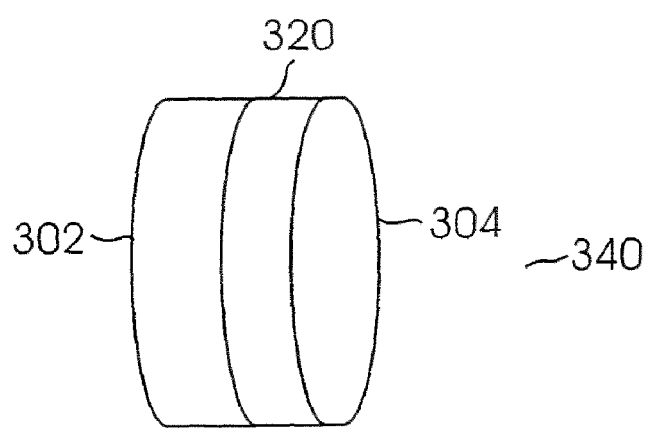
Figure 3D:
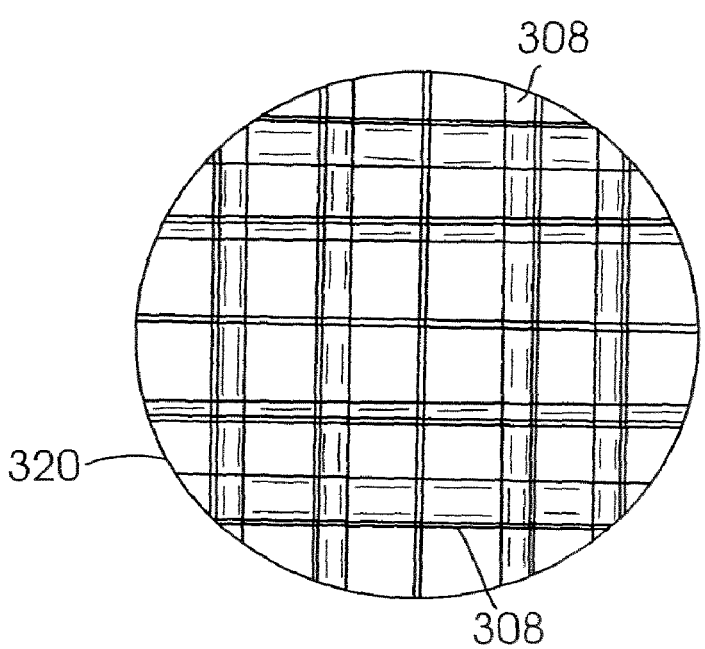
Figure 3E:
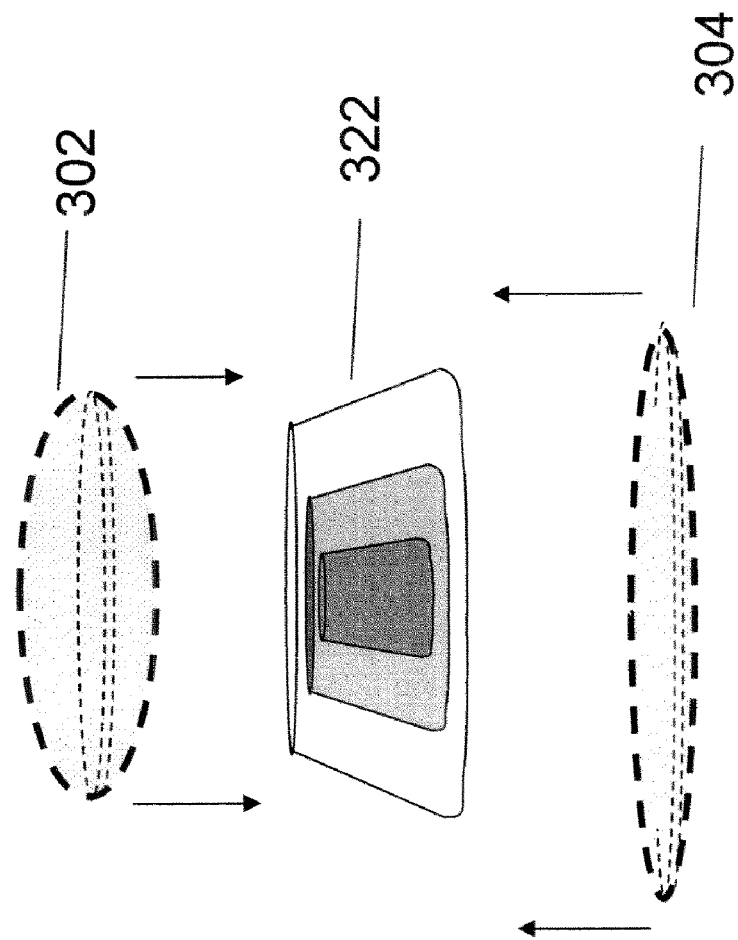

In another embodiment, an array (320) of baffles (also referred to as "baffle array" 320) is formed (as shown in FIGS. 3B and 3D). Baffle array 320 comprises a plurality of planar baffles 308 arranged in rows and columns (FIG. 3D). Each planar baffle 308 is roughly parallel to the optical path of imaging system 300 (FIG. 3A). The number of baffles 308 in a baffle array 320 may vary depending on the type of lens in an optical system. As an example, FIG. 3D shows ten baffles in the baffle array 320. In one embodiment, the baffle array may be formed of baffles having co-axial conical sections shown as 322 in FIG. 3E.

Array 320 is disposed (sandwiched) between lenses 302 and 304, to form a baffled lens unit 340 (FIG. 3C). Array 320 may be contoured in a shape conforming to the structure of lens 302 and 304. Array 320 fills an entire volume between the lens 302 and 304. Baffles 308 in the array 320 are made from optically absorbing material in one embodiment. Baffles may also be coated with an optically absorbing material in another embodiment. The optically absorbing baffles prevent propagation of stray light within the imaging system 300.

Array 320 has planar baffles which when placed between the lens elements 302 and 304 of imaging system 300 are substantially parallel to the optical path. As explained with respect to FIG. 3A, planar baffles 308 placed in the imaging system 300 have lens elements (302 and 304) acting as telecentric lenses thereby preventing propagation of stray light. Imaging system 300 having an array 320 of planar baffles 308 positioned between consecutive lenses is able to effectively provide sharp and accurate images.

Figure 4A:
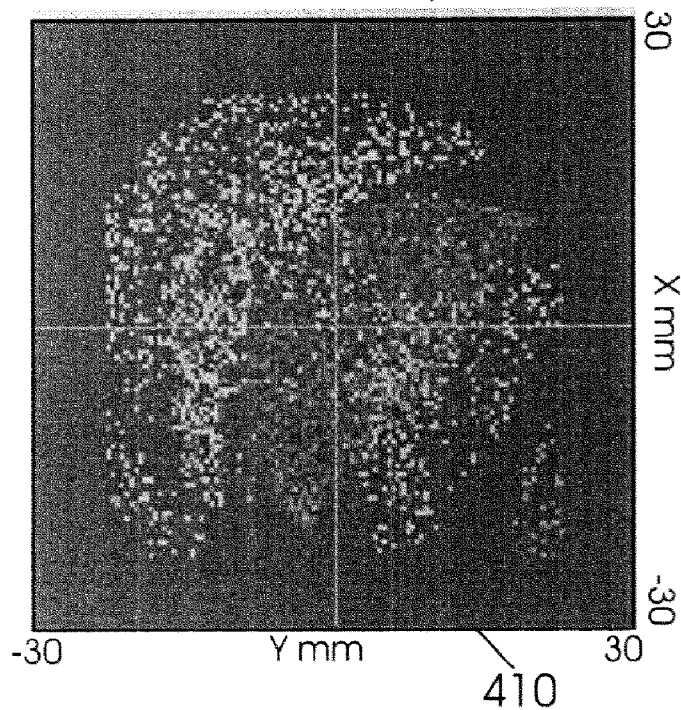
FIGS. 4A-4B and 5A-5B show a comparison of an image formed by a conventional imaging system and the imaging systems of the present disclosure.
Figure 4B:
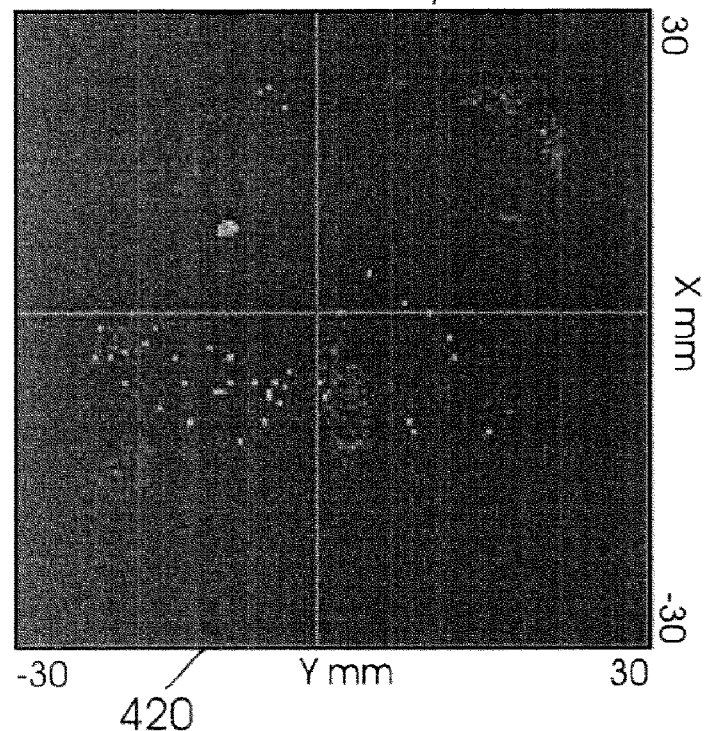

FIG. 4A shows an image 410 formed by a conventional imaging system 100. Image 410 is cluttered due to the stray light effect. FIG. 4B shows an image 420 formed by imaging system 300 of the present disclosure. Image 420 is sharper than image 410. Imaging system 300 substantially reduces the effect of stray light on an image, according to one embodiment.

Figure 5A:
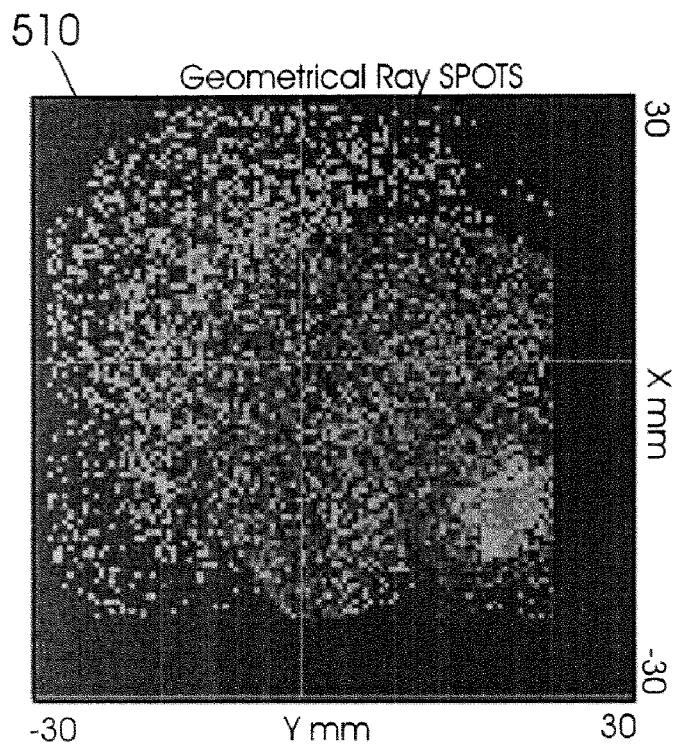
Figure 5B:
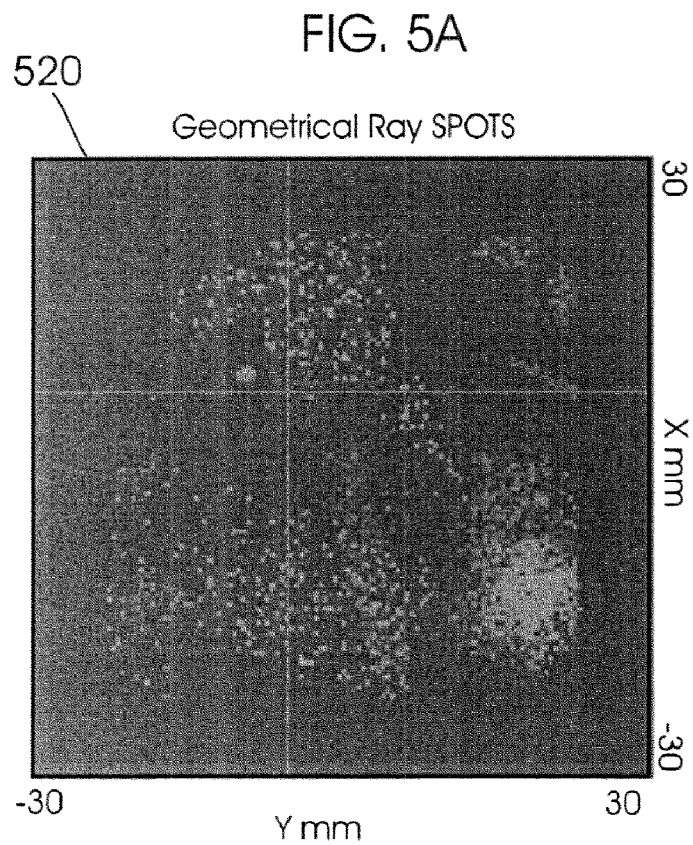

In one embodiment, imaging system 300 forms a sharp image of targets that may be close to a source of light. As an example, FIGS. 5A-5B show images of a target which is proximal to the sun. FIG. 5A shows an image 510 formed by a conventional imaging system 100. In image 510, the target is not clearly visible because proximity to the sun causes flare in the image. FIG. 5B shows an image 520 formed by the imaging system 300 where the target is clearly seen. Imaging system 300 according to one embodiment provides sharp and clear images even when exposed to intense illumination by a source of light.

The imaging system of the present disclosure is especially useful for use in missile and aircraft applications, where a sunshield or hood is undesirable or may not possible. Use of imaging systems with inter-lens baffle unit, significantly improves target visibility. The imaging system of the present disclosure may also be used in cameras where lens hoods are not preferred, for example single use disposable cameras.

Although the present disclosure has been described with reference to specific embodiments, these embodiments are illustrative only and not limiting. Many other applications and embodiments of the present disclosure will be apparent in light of this disclosure and the following claims.

I claim:

1. An inter-baffle lens unit for an imaging system, comprising:
    a plurality of baffles positioned between at least two lens elements, wherein each of the plurality of baffles are contoured to extend between a concave surface of a first lens element and a convex surface of a second lens element such that each of the plurality of baffles is parallel to an optical path of the imaging system; and
    wherein, over a portion of a field of view, the first lens element and the second lens element each act as a telecentric lens having a constant viewing angle at any point across a pupil aperture of the imaging system.

2. The inter-baffle lens unit of claim 1, wherein the plurality of baffles are arranged in rows and columns.

3. The inter-baffle lens unit of claim 1, wherein the plurality of baffles include a plurality of co-axial conical baffle sections.

4. The inter-baffle lens unit of claim 1, wherein the baffles are made of optically absorbing material selected from a group consisting of carbon composite, plastic and thin black metallic material.

5. The inter-baffle lens unit for an imaging system of claim 1, wherein the plurality of baffles eliminates an introduction of stray light into the imaging system.

6. An optical system, comprising:
    at least a first lens and a second lens; and
    an array of baffles extending between a concave surface of the first lens and a convex surface of the second lens, forming a baffled lens unit such that each baffle in the array of baffles is parallel to an optical path of the optical system; wherein the array is contoured so that over a portion of a field of view, the first lens element and the second lens element each act as a telecentric lens having a constant viewing angle at any point across a pupil aperture of the optical system.

7. The optical system of claim 6, wherein the array of baffles includes a plurality of baffles arranged in rows and columns.

8. The optical system of claim 6, wherein the array of baffles includes a plurality of co-axial conical baffle sections.

9. The optical system of claim 6, wherein the baffles are made of optically absorbing material selected from a group consisting of carbon composite, plastic and black metallic material.

10. The optical system of claim 6 is used in terrestrial cameras and telescopes of a space vehicle.

11. The optical system of claim 10, wherein the space vehicle includes a space shuttle, a missile, a space station and an aircraft.

12. The optical system of claim 6, wherein the array of baffles eliminates an introduction of stray light into the optical system.

13. An optical system, comprising:
    a plurality of lenses; and
    an array of baffles positioned between each of a plurality of lenses, forming a baffled lens unit; wherein each baffle in the array fits between a concave surface of one lens and a convex surface of another lens and wherein, over a portion of a field of view, each of the plurality of lenses acts as a telecentric lens having a constant viewing angle at any point across a pupil aperture of the optical system.

14. The optical system of claim 13, wherein the baffles are made of optically absorbing material selected from a group consisting of carbon composite, plastic and black metallic material.

15. The optical system of claim 13, wherein the array of baffles includes a plurality of baffles arranged in rows and columns.

16. The optical system of claim 13, wherein the array of baffles includes a plurality of co-axial conical baffle sections.

17. The optical system of claim 13 is used in terrestrial cameras and telescopes of a space vehicle.

18. The optical system of claim 17, wherein the space vehicle includes a space shuttle, a missile, a space station and an aircraft.

19. The optical system of claim 13, wherein the array of baffles eliminates an introduction of stray light into the optical system.

* * * * *